UNITED STATES PATENT OFFICE.

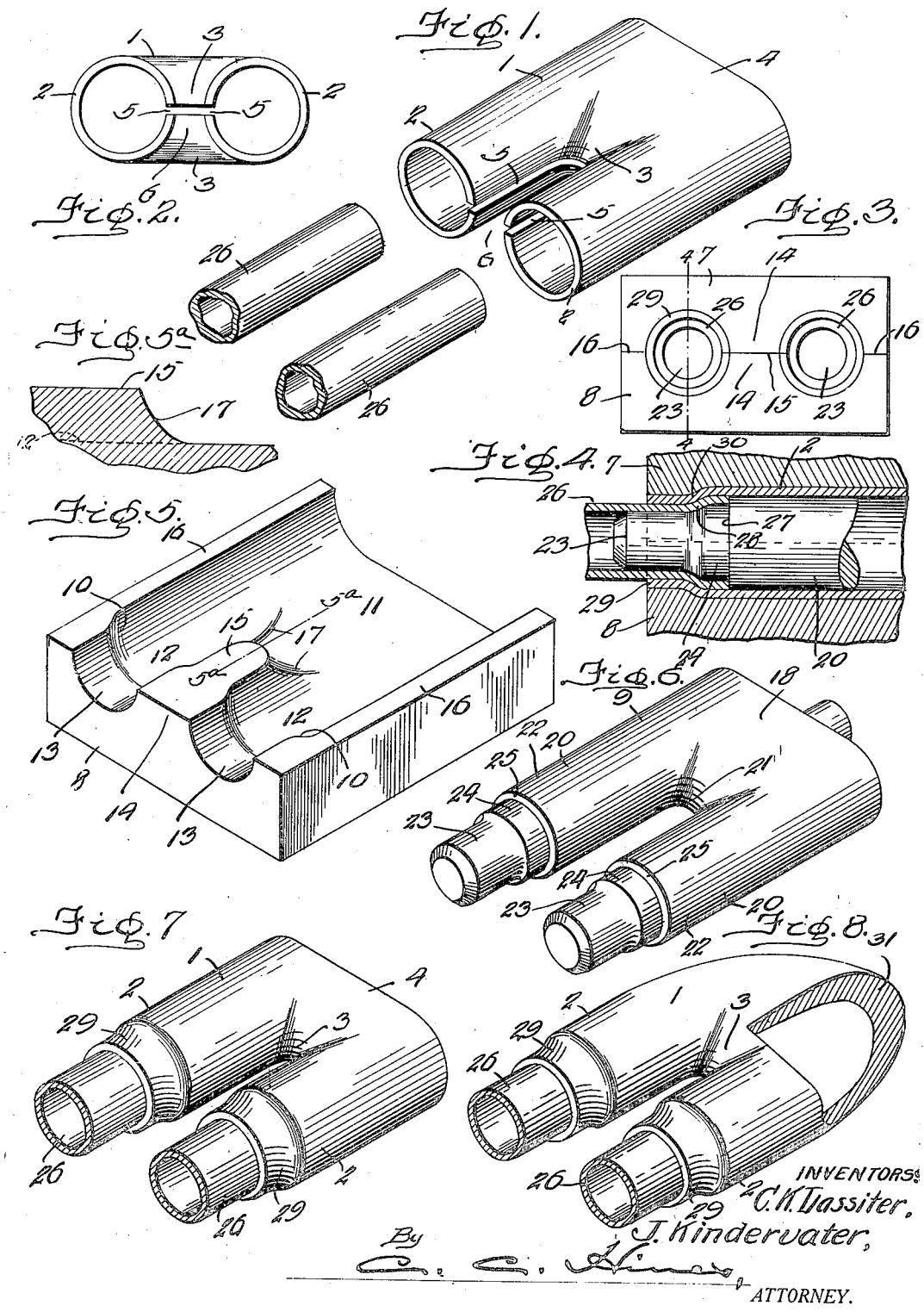

COLUMBUS K. LASSITER AND JULIUS KINDERVATER, OF NEW YORK, N. Y.

CONNECTING PIPES AND RETURN BENDS.

1,417,395.  Specification of Letters Patent.  Patented May 23, 1922.

Application filed November 24, 1920. Serial No. 426,248.

*To all whom it may concern:*

Be it known that we, COLUMBUS K. LASSITER and JULIUS KINDERVATER, citizens of the United States, residing at New York, in the county of New York and State of New York, have invented new and useful Improvements in Connecting Pipes and Return Bends, of which the following is a specification.

This invention relates to a method of connecting pipes and return bends and to the novel and improved structural organization or conducting unit resulting therefrom.

One object of the invention is to provide a novel method of forming the pipe receiving sockets of a return bend and welding the ends of the pipes therein, whereby a strong and durable form of connection is secured.

Another object of the invention is to provide a construction of parts whereby such method may be employed in a highly efficient and satisfactory manner, and whereby a superior resultant construction of conducting unit may be produced.

Still another object of the invention is to provide a conducting unit of superior character for general use, and which is particularly advantageous in the manufacture of superheater elements for smoke tube superheaters.

In an application for patent executed of even date herewith, filed Nov. 24, 1920, Serial No. 426,246, we have described a preferred way of making the leg-end of a return bend, such leg-end embodying a pair of split tubular sockets to receive the ends of the pipes which are to be joined by and to the bend. The present invention starts with and contemplates the use of an incomplete bend having a leg-end of this character, although it is to be understood that any possible equivalent structure may be employed.

The invention will be better understood by reference to the following description, taken in connection with the accompanying drawing, in which:—

Figure 1 is a view in elevation of the incomplete return bend and the ends of a pair of pipes to be joined thereto.

Figure 2 is an end view of the incomplete bend.

Figure 3 is a view illustrating the welding action.

Figure 4 is a section on line 4—4 of Figure 3.

Figure 5 is a perspective view of one of the welding dies.

Figure 5ª is a detail section thereof.

Figure 6 is a perspective view of the welding mandrel.

Figure 7 is a view of the incomplete bend with pipes welded thereto.

Figure 8 is a view of the complete unit showing only necessary portions of the pipes.

The incomplete bend illustrated in Figures 1 and 2 is shown as comprising a body 1 having at one end a pair of parallel incomplete tubular legs or sockets 2 and an incomplete crotch portion 3, the said body 1 being of elliptical form in cross-section between said crotch portion and its opposite fully open end 4. The legs and crotch portion are incomplete by reason of the fact that a slot or bifurcation 5 is left in the formation of such incomplete bend, said slot or bifurcation 5 extending entirely around the boundary of the crotch space or opening 6 and medially splitting or sub-dividing the inner sides of the legs and the apex of the crotch portion into opposed walls, such walls being spaced by a continuous cleft or gap and designed to be closed and welded together to complete the formation of the leg-end of the bend. It will be understood that with this construction the incomplete legs or sockets are adapted to be contracted, when closed and welded, to produce complete legs or sockets of slightly smaller diameter than said incomplete legs. The incomplete bend 1 is formed from a single piece of tubular stock between shaping or swaging dies. The action of these dies leaves similar slot walls of the legs and crotch connected by spaced bridge pieces extending across the crotch space or opening 6. These bridge pieces are cut or punched out, leaving the partially complete bend in the form herein shown, with the crotch space or opening 6 free and clear or devoid of contained portions or obstructions. Such partially complete bend is then heated to welding heat and subjected to the action of a pair of counter-part welding dies 7 and 8 and a cooperating welding mandrel 9, whereby the legs and crotch are closed and the previously open walls thereof welded to complete the formation of the leg-end of the bend.

As stated, the die members 7 and 8 are of counterpart construction so far as their forming surfaces are concerned. The lower die member 8 is shown in detail in Figure 5 and comprises a block having at one end two parallel semi-circular grooves, generally indicated at 10, merging at their inner ends into a semi-elliptical channel or cavity 11, which opens through the opposite ends of the block. Each groove 10 is composed of inner and outer portions 12 and 13 of different diameters, the portion 12 being of the same diameter as the normal external diameter of the split legs 2 and the portion 13 of relatively smaller diameter. The grooves 10 are separated by an intermediate rib 14 having its inner face 15 terminating in the same horizontal plane as the abutment edges 16 at the sides of the block. The rib 14 has at its inner end a continuation in the form of a substantially triangular or wedge-shaped boss 17, which extends therefrom toward the opposite end of the block and whose upper face inclines or slopes toward the bottom of the channel 11 and merges thereinto. At its apex portion, which joins the inner end of the rib, the boss is of the same width as the rib, the sides of the rib thence diverging and the boss gradually increasing in width until at its base it is both materially shallower and wider than the rib. The grooves and cavities of the die blocks are of proper shape to respectively receive the leg portions and the elliptical body portion of the incomplete bend 1, but are of somewhat relatively shallower depth, so that when the aforesaid parts are assembled for the welding operation the ribs 14 and abutment faces 16 of the die members will stand apart a distance corresponding to the degree of opening movement required to close the dies and the bifurcated portion of the bend and weld the walls of the latter together. In this operation the ribs 14 extend into and move through the crotch opening 6 until their faces 15 abut at the time the abutment surfaces 16 of the die blocks contact, thus properly shaping and compressing together the walls to be welded. The welding mandrel 9, which is of the breeches-type, is inserted into the partially completed bend 1 for cooperation with the dies in the welding action, and comprises an elliptical body portion 18 to fit within the elliptical body portion of the bend, cylindrical leg portions 20 to fit within and extend through the split legs 2, and a wedge-shaped crotch-forming portion 21. Each leg 20 is provided with an inner circular portion 22 of major diameter, an outer circular portion 23 of minor diameter, an intermediate circular portion 24 of mean diameter, and an abutment shoulder 25 at the point of intersection of such surfaces 22 and 24. The dies and mandrel, constructed as above described, are designed for a specific mode of closing and welding the legs and crotch of the bend and simultaneously lap-welding and mechanically interlocking therein the ends of the tubes or pipes 26 which are to be joined by the bend. As shown each pipe end may be primarily provided with an enlarged or expanded extremity 27 forming an annular shoulder 28, or said expanded extremity may be formed upon the pipes, as hereinafter described, by the action of the mandrel during the operation of closing and welding the legs and welding the pipe ends therein.

Referring to Figures 3 and 4, illustrating the use of the dies 7 and 8 and the mandrel 9, it is to be understood that the dies, mandrel, bend and pipes having been assembled or brought into working relationship, with the pipe ends fitted in the split legs, the pipe ends and bend having previously been heated to welding temperature, the primarily spaced dies are subjected to hammer blows or pressure until they have been moved from initial to the fully closed position shown in Figures 3 and 4, in which their abutment surfaces 16 and faces 15 of the ribs 14 respectively come in abutting contact. This action causes the forming surfaces of the dies to contract or shrink the split legs of the bend about the legs of the mandrel and the pipe ends, thereby closing the clefts in the legs and crotch and welding the edge walls thereof together and simultaneously welding the pipe ends within and to the legs. By this operation a strong and durable welding connection is secured, inasmuch as the free space or passage 6 between the legs and the presence of the clefts allows free passage of heat to and between the surfaces to be welded, with the result that they will be uniformly welded and a more perfect weld obtained, while the drawing of the legs about the pipe ends ensures a most perfect connection. It will be understood that the shoulders 25 of the mandrel 9 limit the insertion of the pipe ends 26 to the exact degree, while the surfaces 23 fit within and support the leg ends adjacent to their extremities during the shaping and welding action. As a result of the shaping and welding action, due to the described form of the groove portions 13 and mandrel portions 24, it will be observed that the outer ends of the legs 2 will be reduced in diameter to the diameter of the pipe ends, as shown at 29, thus forming in each leg an offset or shoulder 30 lying outwardly beyond and engaging the shoulder 28 of the expanded end 27 of the pipe. By this construction a mechanical interlock between each leg and pipe is provided which reinforces the weld and tends to prevent possible relative outward endwise movement and separation of the parts under strain, thus adding to the security of the connection. It is to be understood that while the pipe ends may be suitably formed with the expanded portions 27 before they are fitted in the legs 2, such operation is unnecessary with the described construction of dies and mandrel when used upon a suitable press, for example an Ajax press, in which the mandrel is moved longitudinally into the inchoate bend and inserted ends of the pipes as the dies are forced together for the compression action, since in such operation the portions 22 of the mandrel legs on entering the pipe ends will spread the same and form the expanded portions and shoulders described, which operation will be completed just prior to the closing and welding of the legs 2 and the shaping of the same to produce the contracted portions 29. This mode of forming the portions 27 and 28 by the action of the mandrel is preferred, as it does away with the necessity of initially forming the expanded portions on the pipe ends before insertion, although either mode of providing the pipe ends with the expanded portions falls within the spirit and scope of our invention. At the conclusion of the leg closing and welding operation above described, the dies and mandrel are removed and the open end of the bend subjected to proper treatment to form a closed end or cap 31, as shown in Figure 8, thus completing the operation of forming the bend as an entirety and connecting it to the ends of the pipe which are to be joined thereby. We have not described herein any particular way of forming the cap end of the bend, as this may be performed by any of the methods heretofore employed in the art, or by the method set forth in our copending application filed Nov. 24, 1920, Serial No. 426,249.

By the mode of connecting a return bend and pipes in accordance with our invention, a strong and durable connection is afforded, which ensures long service and freedom from liability of leakage of the circulating fluid, inasmuch as a form of connection is produced which will stand all service strains.

Having thus fully described our invention, we claim:

1. The method of connecting pipes and return bends, which consists in providing a bend with split tubular leg portions, fitting ends of pipes in the leg portions, and then closing and welding the walls of said split leg portions and simultaneously welding said pipe ends to and within said leg portions.

2. The method of connecting pipes and return bends, which consists in providing a bend with tubular leg portions, fitting ends of pipes in the leg portions, and then diametrically contracting said legs about and mechanically interlocking them with said pipe ends and welding the same thereto.

3. The method of connecting pipes and return bends, which consists in providing a bend with split leg and crotch portions, fitting ends of pipes in the split leg portions, and then simultaneously contracting said leg portions about the pipe ends, closing and welding the walls of the split leg and crotch portions, and welding the leg portions to said pipe ends.

4. The method of connecting pipes and return bends, which consists in providing a breeches-shaped bend having tubular leg portions and a crotch portion and bifurcated along the inner sides of the legs and across said crotch portion, the walls of said bifurcation being spread, fitting pipe ends in the leg portions, and then, under the action of dies and welding heat, simultaneously contracting and closing the leg portions about the pipes, welding the walls of the bifurcation and welding the leg portion to said pipes.

5. The process of connecting pipes and return bends, which consists in providing a breeches-shaped bend having tubular leg portions and a crotch portion and bifurcated along the inner sides of the legs and across said crotch portion, heating the ends of pipes and fitting the same in the leg portions, heating the leg portions and inserted pipe ends to welding temperature, and then subjecting the parts to pressure so as to close the leg portions and crotch and contract said leg portions about the pipes and weld the walls of the bifurcation together and the pipe ends to and within the leg portions.

6. The method of connecting pipes and bends, which consists in providing a bend with tubular leg portions, fitting pipe ends within the leg portions, said pipe ends having shoulders, and welding the leg portions and pipe ends together and simultaneously forming the leg portions with portions which lie beyond and engage said shoulders.

7. The method of connecting pipes and bends, which consists in providing a bend with tubular leg portions, fitting pipe ends in said leg portions, said pipe ends having expanded extremities, and welding the legs and pipe ends together and simultaneously forming the legs with contracted portions lying beyond and adjacent to the expanded extremities of the pipe ends.

8. The method of connecting pipes and bends, which consists in providing a bend with split leg and crotch portions, the walls of the split being spaced and extending continuously around the crotch boundary, fitting pipe ends in said legs, said pipe ends having expanded extremities, and then simultaneously closing the split, welding the walls thereof, welding the pipe ends to and within the legs and forming said legs with contracted portions lying beyond and adjacent to the expanded extremities of the pipe ends.

9. The method of connecting pipes and bends, which consists in providing a bend having split sockets, fitting the ends of pipes in said sockets, spreading the extremities of the pipes, and closing and welding the walls of the sockets and welding the sockets to the pipe ends and simultaneously contracting portions of the sockets about the pipe ends beyond said expanded extremities of the pipes.

10. A return bend having tubular leg sockets, and pipes having end portions fitted in and welded to said sockets, said sockets and pipe ends having engaging relatively instruck and outstruck portions.

11. A return bend having tubular leg sockets, and pipes having end portions fitted in and welded to said sockets mechanically interlocked therewith.

12. A return bend having leg sockets, and pipes having end portions fitted in said sockets, said leg sockets and pipe ends being welded together, and said leg sockets being initially split and diametrically contracted about the pipes so as to close their slit walls, said walls being welded together.

13. In means for connecting pipes and return bends, a return bend having leg sockets, and pipes having end portions fitted and welded to said sockets, said pipes and sockets being provided with opposed engaging surfaces connecting the same against relative outward endwise movement.

14. In means for connecting pipes and return bends, pipes having end portions provided with shoulders, and a return bend provided with leg sockets receiving said end portions of the pipes and having welding connection therewith, said sockets having shoulders coacting with the shoulders on the pipe ends to hold the pipes and bend against independent relative outward endwise motion.

In testimony whereof we affix our signatures.

COLUMBUS K. LASSITER.
JULIUS KINDERVATER.